United States Patent [19]
Palmer et al.

[11] Patent Number: 5,464,315
[45] Date of Patent: Nov. 7, 1995

[54] SQUEEZE AND LIFT APPARATUS

[75] Inventors: Arthur V. Palmer, Ashville; Gary Leonard, Lakewood, both of N.Y.

[73] Assignee: Dawson Metal Company, Inc., Jamestown, N.Y.

[21] Appl. No.: 404,119

[22] Filed: Mar. 14, 1995

Related U.S. Application Data

[63] Continuation of Ser. No. 127,424, Sep. 27, 1993, abandoned.

[51] Int. Cl.[6] ........................................ B66F 3/00
[52] U.S. Cl. ................. 414/458; 414/451; 414/490; 414/621; 414/786
[58] Field of Search .................. 414/458, 459, 414/618, 621, 490, 450, 451, 786

[56] References Cited

U.S. PATENT DOCUMENTS

| | | | |
|---|---|---|---|
| 1,410,991 | 3/1922 | Cadwalader | 414/618 |
| 1,710,096 | 4/1929 | Luce | 414/618 |
| 1,717,194 | 6/1929 | Daoust | 414/621 X |
| 1,734,330 | 11/1929 | Grab | 414/459 |
| 1,745,049 | 1/1930 | Systrom | 414/459 |
| 1,777,019 | 9/1930 | Samuelsson | 414/459 |
| 2,866,504 | 12/1958 | Syers, Sr. | 414/621 X |
| 2,959,310 | 11/1960 | Meister, Jr. | 414/459 |
| 3,170,705 | 2/1965 | Peterson | 414/458 X |
| 3,410,431 | 11/1968 | Vik | 414/621 X |
| 4,026,522 | 5/1977 | Dranselka | 254/30 |
| 4,050,671 | 9/1977 | Coleman | 254/7 R |
| 4,269,560 | 5/1981 | Thomas | 414/459 |
| 4,599,034 | 7/1986 | Kennedy et al. | 414/678 |
| 5,051,056 | 9/1991 | Gibbons et al. | 414/678 |
| 5,145,154 | 9/1992 | Bastille et al. | 254/10 B |

OTHER PUBLICATIONS

89XX9957W Heavy–Duty Hydraulic Hand Jacks, J. C. Whitney & Co., Catalog #551J, p. 152.
Rais–N–Rols, C&H Buyers Guide, Catalog 922, p. 169, C&H Distributors, Inc., May/Aug. 1992.

Primary Examiner—David A. Bucci
Attorney, Agent, or Firm—Hodgson, Russ, Andrews, Woods & Goodyear

[57] ABSTRACT

A dolly which may be used in pairs to clampingly engage respective ends of heavy elongate objects followed by upward movement of one frame relative to another to lift the object so that it may be easily and safely transported.

23 Claims, 5 Drawing Sheets

SQUEEZE AND LIFT APPARATUS

This application is a continuation of application Ser. No. 08/127,424 filed Sep. 27, 1993, now abandoned.

The present invention relates generally to apparatus for lifting and transporting freight. More particularly, the present invention is related to apparatus for lifting and transporting heavy elongate objects such as window walls.

A crate for, for example, a window wall for a commercial building may perhaps be about 4 to 15 inches wide, 3 to 9 feet high, and perhaps 10 to 15 feet long or longer and have a weight of perhaps up to 4000 pounds. Such a piece of freight may not be easily lifted and transported by conventional dollies. Thus, such a piece of freight is usually manhandled by providing several people to lift and transport the object. Clearly, it is desirable to provide an easier method for lifting and transporting such a heavy item of freight.

Dollies have been provided which are usable in pairs for lifting and moving big bulky machinery, plate glass, and the like. In such a dolly, a hand-actuated hydraulic jack raises and lowers forks for lifting machinery after which it may be rolled along the floor by a pair of wheels on one dolly and a pair of wheels on the other dolly. Such a dolly is shown on page 169 of the May/August, 1992, catalog of C&H Distributors, Inc., of Milwaukee, Wis. and identified as a 1 to 5-ton capacity hydraulic Rais-N-Rols.

The Rais-N-Rols dolly undesirably does not suitably stabilize a large heavy object such as a window wall so that it can be transported easily and safely.

U.S. Pat. No. 4,026,522 to Dranselka discloses a single post pulling apparatus which is attached to the rear lifting mechanism of a tractor. The apparatus comprises a pair of spring-biased opposed plates which are pivotably mounted to a horizontal support member for frictionally engaging a post positioned therebetween. Operation of the plates is by means of cables. After a post is engaged, the tractor lift mechanism is raised by a hydraulic means whereby the apparatus also is moved vertically to pull the post upwardly.

U.S. Pat. No. 4,050,671 to Coleman discloses a single door hanger device or dolly having a series of both vertically spaced and horizontally spaced clamps aligned for clamping and holding at least two doors simultaneously in either a vertical or horizontal position. The clamp positions are adjustable.

U.S. Pat. No. 4,599,034 to Kennedy et al discloses a lift which is usable in a pair for lifting an automobile. A carriage is moved up and down an upright by an actuator. A support rack connects to the underside of the respective vehicle end and to a journal which is rotatably borne by the carriage whereby the automobile may be easily rotated once it has been lifted for easy access to its underside.

U.S. Pat. No. 5,051,056 to Gibbons et al discloses a pair of boat jacking devices adapted to lift the ends respectively of a boat and to rotate the boat about its longitudinal axis. The devices for the bow and stern of the boat are constructed differently.

U.S. Pat. No. 5,145,154 to Bastille et al discloses a pair of devices for lifting the front and rear respectively of a snowmobile. The lift is actuated by a pivoted handlebar controlling a snowmobile chassis-engaging bracket through a parallelogram linkage. A nonhydraulic ram is connected to the parallelogram linkage. Fluid pressure is caused to build up in the ram during lowering of the snowmobile to provide power assist when raising the snowmobile.

None of the above patents provide a suitable solution to the problem of providing adequate stability to a heavy elongate piece of freight as it is being transported by a pair of dollies at the respective ends thereof.

It is accordingly an object of the present invention to provide apparatus for easily and safely lifting and transporting heavy elongate objects.

In order to provide safe and easy lifting and transport of such a heavy elongate object, in accordance with the present invention a dolly is provided which is usable in pairs at the opposite ends respectively of the object. The dolly has a first frame to which wheel means is attached and a second frame which is connected to the first frame for movement vertically relative to the first frame. At least one pair of clamp members is connected to the second frame. The dolly includes means for applying force to effect movement of the clamp members to clampingly engage freight and thereafter to effect upward movement of the second frame relative to the first frame for lifting the clampingly engaged freight.

The above and other objects, features, and advantages of the present invention will be apparent in the following detailed description of the preferred embodiments thereof when read in conjunction with the accompanying drawings wherein the same reference numerals denote like or similar parts throughout the several views.

DETAILED DESCRIPTION OF THE PREFERRED EMBODIMENTS

Figure 1:
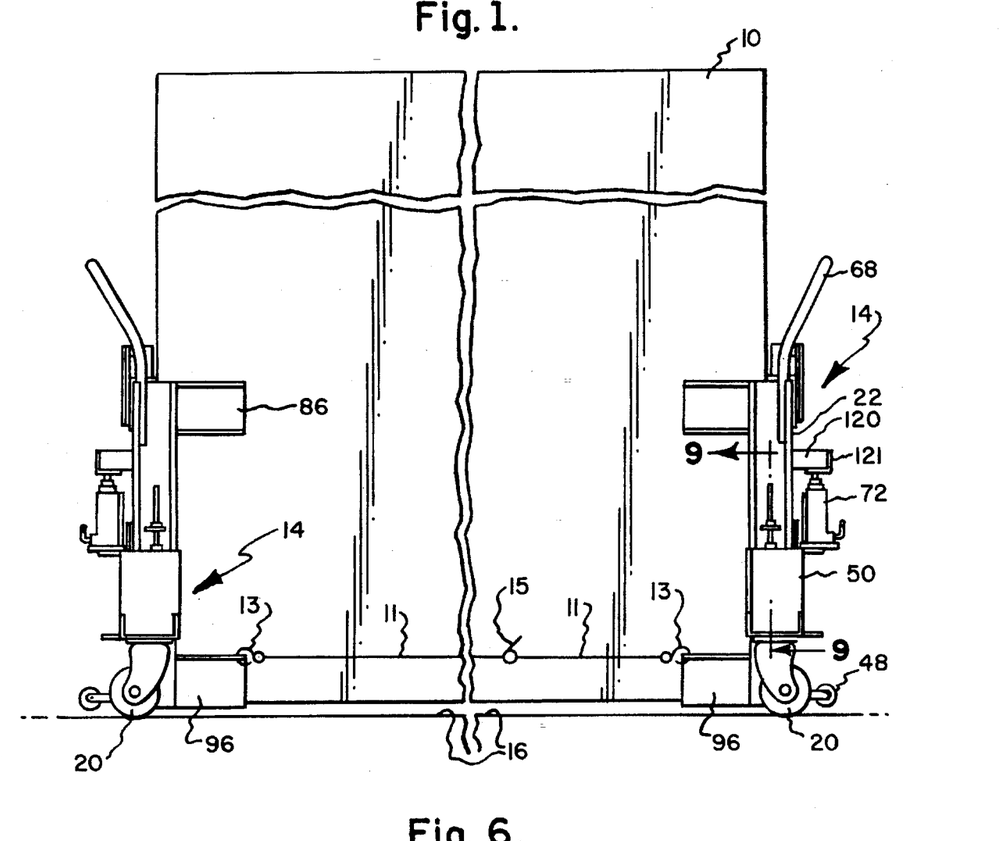
FIG. 1 is a side view of a pair of dollies which embody the present invention and illustrated in the process of transporting a heavy elongate piece of freight.

Referring to FIG. 1, there is shown at 10 a heavy elongate crate, which may have a length of perhaps 10 to 15 feet. The crate 10 may contain, for example, a window wall for a commercial building. A pair of dollies, illustrated generally at 14, are provided at respectively opposite ends of the crate 10 for lifting and transporting thereof. Thus, the crate is shown to be lifted off of the floor 16. Since both of the dollies 14 are identical, only one is shown in the remaining views and described herein.

A more detailed view of a dolly 14 is shown in FIGS. 2 to 11. In these other views (FIGS. 2 to 11), the dolly 14 is shown in a position prior to an operation for lifting and transporting an object.

Figure 2:
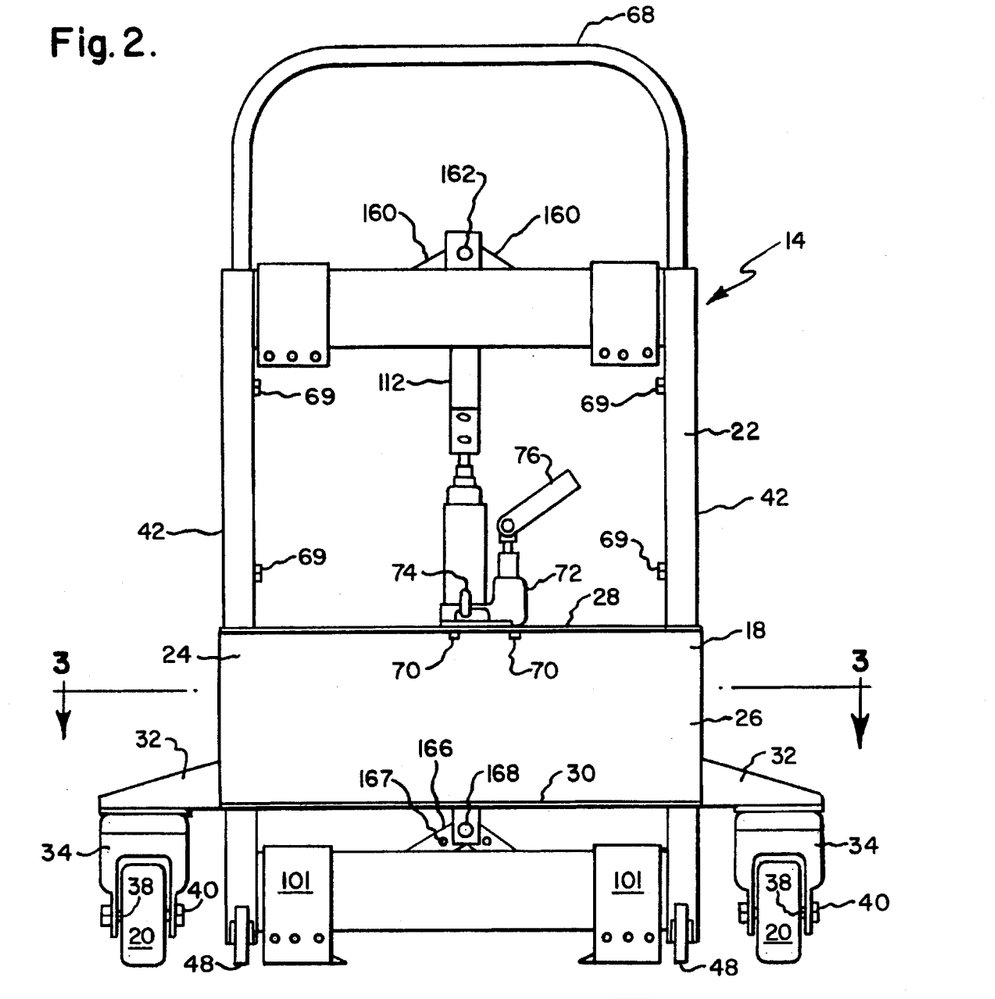
FIG. 2 is a rear elevation view of one of the dollies of FIG. 1, shown prior to engaging and lifting an object.
Figure 3:
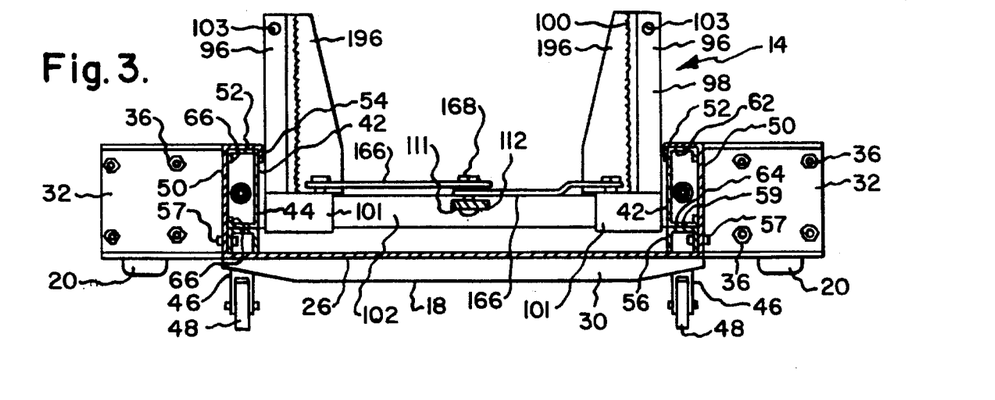
FIG. 3 is a sectional view taken along lines 3—3 of FIG. 2.
Figure 4:
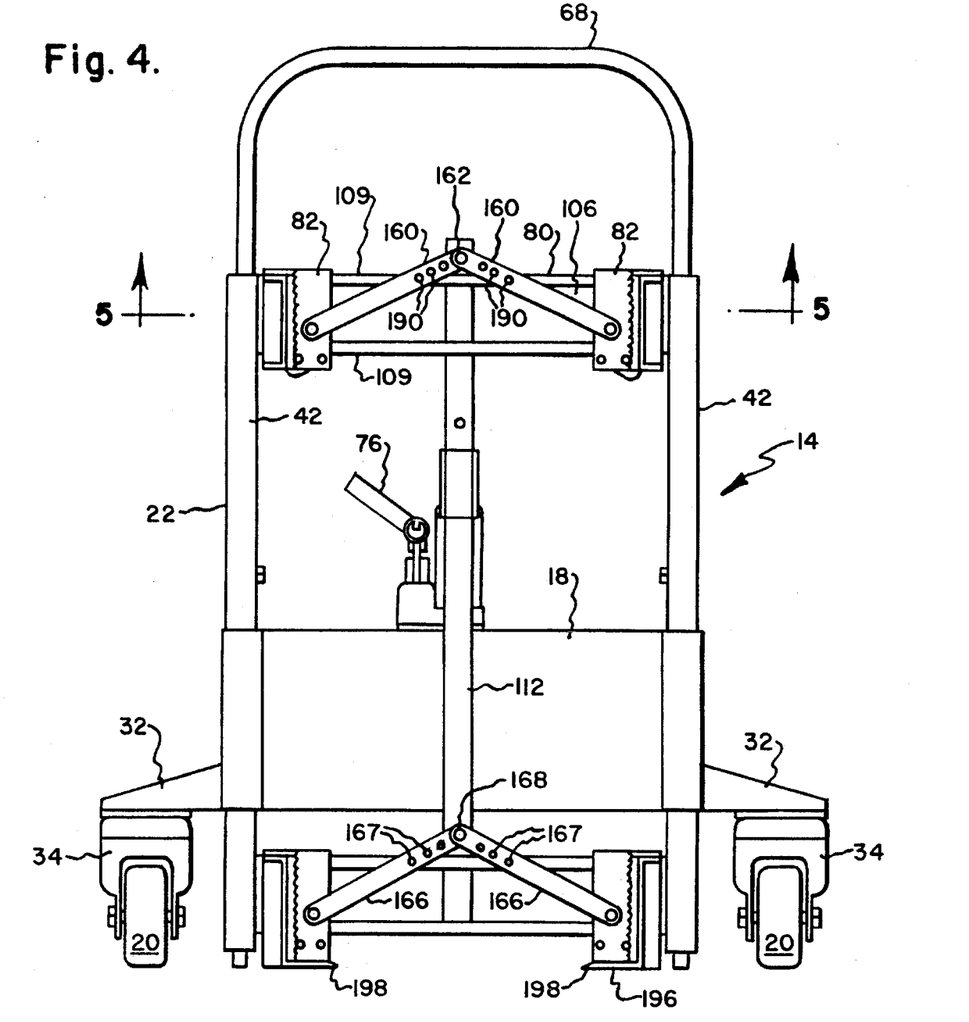
FIG. 4 is a front elevation view thereof.

Referring to FIGS. 2, 3, and 4, dolly 14 includes a first frame 18 which remains generally stationary, i.e., it does not move upwardly when an object is lifted. Suitably attached to the first frame 18 are a pair of wheels 20. The provision of a pair of wheels 20 on one dolly and the pair of wheels 20 on the other dolly provides a total of 4 wheels for transporting an object by a pair of dollies once it has been lifted.

The dolly 14 also includes a second frame 22 which is movable vertically relative to the first frame 18 for lifting an object.

The first frame 18 is composed of a plate 24 of suitable material such as steel having a thickness of perhaps about 1/8 inch or of more than one such plate welded or otherwise suitably attached together, the plate 24 including a rectangular vertically oriented portion 26 with the long edges being horizontal. The plate 24 is formed to have upper and lower horizontally oriented portions 28 and 30 respectively normal to the rectangular portion 26 and extending rearwardly from the upper and lower horizontal edges respectively thereof. The plate 24 is further formed to have vertically oriented portions 50 extending forwardly from the vertical edges respectively of rectangular portion 26 to forward edges of portions 50, vertically oriented portions 52 extending parallel to rectangular portion 26 and inwardly (toward each other) from the forward edges respectively of portions 50 to inner edges of portions 52, and vertically oriented portions 54 extending parallel to portions 50 and rearwardly from the inner edges respectively of portions 52 and terminating at rearward edges respectively which are forward of the rectangular portion 26. A pair of elongate vertical three-sided U-shaped brackets 56 are provided in the corners of portions 26 and 50 and are bolted by bolts 57 or otherwise suitably attached to the portions 50 respectively and each presents a central portion 59 spaced from portion 26 and aligned with and parallel to and extending over about the same distance as portion 52 respectively extends. For example, as seen in a horizontal section as shown in FIG. 3, portion 26 may extend over a distance of about 22 inches, portions 50 may each extend over a distance of about 5 inches, portions 52 may each extend over a distance of about 2 inches, portions 54 may each extend over a distance of about 1 inch, and the rectangular plate 26 as well as plates 50, 52, 54, and 56 may each extend over a height of about 8 inches, thus providing what might be characterized as vertical channels, illustrated at 60, on opposites sides of the first frame 18.

A pair of brackets 32 extend outwardly from the lower edges of the side portions 50 respectively and are welded or otherwise suitably securely attached thereto. Suitable casters 34 are suitably attached by bolts 36 or other suitable fastening means to the brackets 32, the casters 34 receiving axles 38 of the wheels 20 which axles are secured thereto by means of nuts 40.

The second frame 22 includes a pair of elongate vertical members 42 formed to have, as shown in FIG. 3, generally C-shaped cross-sections which are complementary to the shapes of the channels 60 to be telescopically received snugly thereby for movement vertically relative thereto, the central portion 44 of each member 42 abutting the respective portion 54 and extending between portions 52 and 59, and the side portions 62 and 64 of each member 42 being normal to portion 44 and abutting or slidingly engaging respective portions 52 and 59 respectively and further having portions 66 extending toward each other from the portions 62 and 64 respectively over a short distance of perhaps about 1 1/2 inch and abutting or slidingly engaging respective portion 50. The elongate members 42, which may have a length of perhaps 30 inches, extend downwardly below the plate 24. Brackets 46 are welded or otherwise suitably securely attached to the lower ends respectively of members 42 and extend rearwardly therefrom and, in order to support dolly 14 in an upright position when a piece of freight is not being handled thereby, suitably support a pair of wheels 48, which are smaller than wheels 20. For example, each wheel 20 may have a diameter of perhaps about 4 1/2 inches, and each wheel 48 may have a diameter of perhaps about 2 inches. The wheels 48 are spaced rearwardly from the wheels 20 and, when the dolly 14 is not lifting an object, support the dolly 14, as shown in FIG. 2, the second or vertically movable frame member 22 being spring-biased for downward movement so that the rollers 48 contact the floor 16 for cooperation with rollers 20 for supporting the dolly 14. The dolly 14 may be tilted for movement along the floor on the rollers 48. A generally inverted U-shaped tubular handle 68 is suitably attached at its ends to the upper ends respectively of elongate members 42 for use in pushing the dolly 14 around. For example, the end portions of the handle 68 may be disposed to extend into members 42 adjacent rear side portions 64 respectively and may extend alongside and be attached to respective portions 44 by bolts 69 or other suitable means.

Resting on top of the upper horizontally disposed plate portion 28 centrally thereof and suitably attached thereto such as by means of screws 70 is a hydraulic jack 72 including a control valve 74 operable between a position for jacking and a position for release. The jack 72 includes a hand-operated handle 76 which is oriented sideways to the dolly and which is operated to effect jacking movement.

Figure 5:
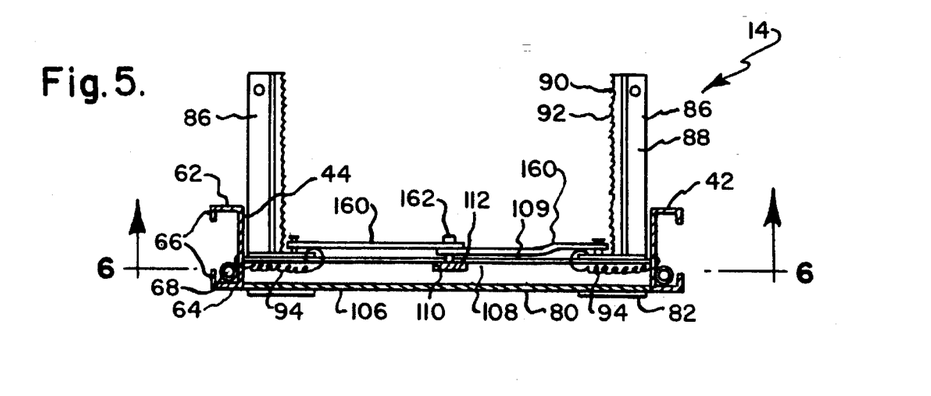
FIG. 5 is a sectional view taken along the lines 5—5 of FIG. 4.
Figure 6:
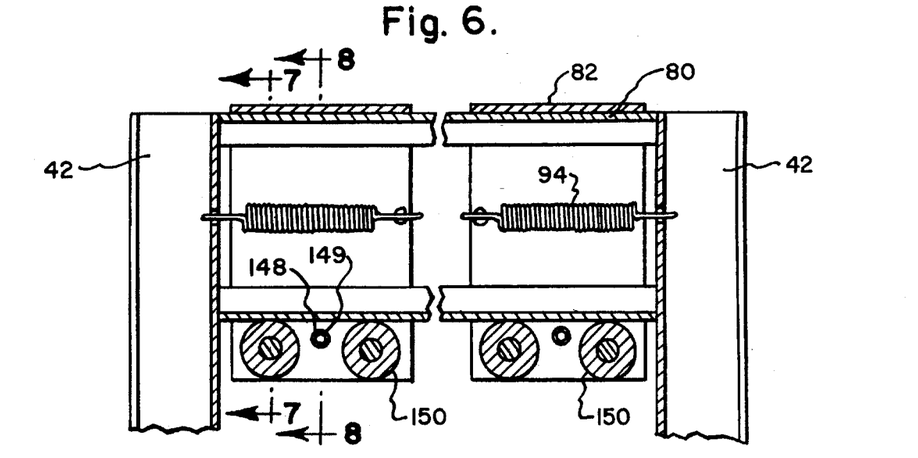
FIG. 6 is a sectional view taken along lines 6—6 of FIG. 5.

Referring to FIGS. 4 and 5, a rail 80 is welded or otherwise suitably attached to and extends between the upper end portions of the vertically moveable elongate members 42. Rail 80 has a vertically oriented portion 106, a pair of horizontally oriented portions 108 perhaps about 1 1/2 inch wide extending forwardly from the upper and lower edges of portion 106, and a pair of vertically oriented portions 109 normal to portions 108 respectively and extending toward each other from the forward edges thereof over a distance of perhaps about 1/2 inch. Openings 110 are provided in the horizontal portions 108 centrally thereof and adjacent the edges from which portions 109 extend.

Rail 80 supports a pair of carriages 82 which are formed of steel plate or other suitable material to snugly wrap-around the rail 80 for sliding movement along the length of rail 80 towards and away from each other.

Figure 7:
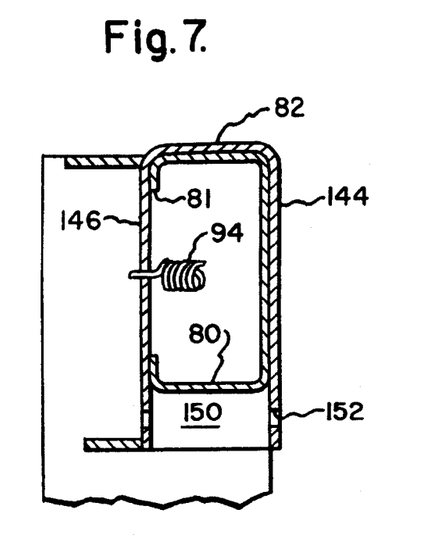
FIG. 7 is a sectional view taken along lines 7—7 of FIG. 6.
Figure 8:
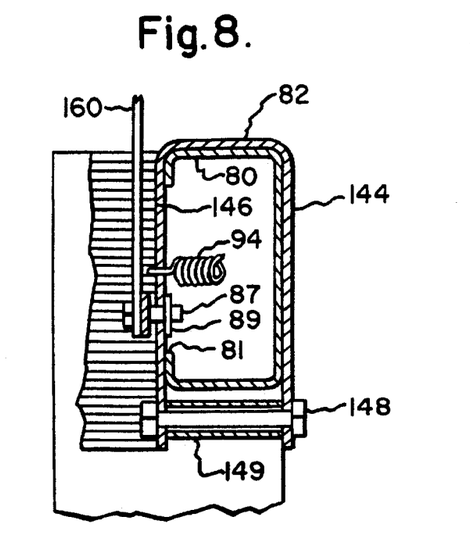
FIG. 8 is a sectional view taken along lines 8—8 of FIG. 6.

As seen in FIGS. 7 and 8, carriages 82 each comprises a single plate formed to be generally U-shaped with a pair of parallel side portions 144 and 146. When rail 80 is received within the carriage, the parallel side portions 144 and 146 of the carriage extend downwardly beyond the rail 80 a distance of perhaps about 1 inch. A spacer 149 extends between carriage portions 144 and 146 and is disposed below and spaced from the rail 80. The spacer 149 is maintained in position by a bolt 148 which is received in the spacer and is attached to carriage portions 144 and 146. Rollers 150 are provided on both sides of the bolt 148 in the space between the carriage portions 144 and 146 and below the rail 80. The axle 152 of each roller 150 is received in apertures in the portions 144 and 146 to thereby provide rolling support of the carriage 82 for easier movement along the rail 80. Carriages 82 may each extend along the length of the rail 80 over a distance of perhaps about 3 inches. Welded or otherwise suitably attached to the outer end portions of the carriages 82 and extending forwardly therefrom are a pair of clamp members 86 respectively in the form of plates 88 to which are adhesively or otherwise suitably attached along their inner or facing surfaces pads 90 of rubber material or other suitable material for cushioning freight. The surfaces of the pads 90 may be scalloped or suitably grooved, as illustrated at 92, for enhanced holding contact between the pads and freight. The plates 88 and the accompanying pads 90 may, for example, have an overall width of perhaps about 4 ½ inches and extend forwardly over a distance of perhaps about 8 inches. The clamp members 86 are spring-biased to their outer positions, i.e., away from each other, as shown in FIG. 4, by means of springs 94 one end of each of which is connected to the respective elongate member portion 44 and the other end of which is connected to the respective carriage 82 at a location inwardly thereof.

A pair of clamp members 96, similar to clamp members 86, having plates and pads 98 and 100 respectively, similar to plates 88 and pads 90 respectively, are attached to respective carriages 101, similar to carriages 82, movable slidably along a rail 102, similar to rail 80, which is welded or otherwise suitably attached to the lower end portion of the elongate members 42 similarly as rail 80 is attached and which contains openings 111 similar to openings 110. Clamp members 96 are also spring-biased away from each other by springs (not shown) which are attached thereto similarly as springs 94 are attached. Thus, there are provided two pairs of clamp members, one upper and one lower, for clamping to freight such as the crate 10.

Alternatively, the plates 88 and 98 may not be provided with pads but instead have teeth to help grip the crate.

As seen in FIG. 1, a pair of straps 11 or other suitable means may be provided to secure the dollies 14 to the crate 10 for safer transport thereof. Thus, a strap 11 may be attached at one end to a respective clamp member 96 by suitable means such as a hook 13, which is received in clamp member aperture 103 (FIG. 3), and at the other end to the crate by suitable means such as a quick release clamp, illustrated at 15. The strap 11 may, for example, be a chain with binder or, for another example, a nylon strap that winches, by a suitable attached winch, the dolly to the crate so that it doesn't slide out.

A bar 112 having a width of perhaps about 1 inch and a height of perhaps about 1 inch and a length of perhaps about 31 inches extends through the four openings 110 and 111 in the rails 80 and 102 respectively for vertical movement therein.

A pair of links 160 are each attached at one end to the upper end portion of the bar 112 by suitable means such as cotter pin 162 for pivoting attachment and at the other end to the vertical portion 146 of the respective carriage 82 pivotally by means of a stud 87. As shown in FIG. 8, the stud 87 is a shoulder-shaped pin the head of which is welded to the link 160 and the shank of which is received in an aperture of the carriage portion 146 and suitably secured such as by cotter pin 89. The rail 80 is generally C-shaped with the opening or cut-out 81 generally along carriage portion 146 whereby the stud 87 passes within the opening so that there is no attachment of the stud 87 to the rail 80. Links 160 are pivotally attached to the bar 112 and carriage 82 so as to slope downwardly from their points of attachment to the bar 112 at pin 162. Pin 162 has a head on one end, its shank is received in apertures in the links 160 and bar 112, and secured for movement of the links relative to the bar such as by a cotter pin (not shown) which is removable for adjusting the effective length of the links. Each of the links 160 has a plurality of holes 190 along its length for receiving the pin 162 for adjusting the effective length of the link. Similarly, a pair of links 166 each is pivotally attached at one end to the lower end portion of the bar 112 by suitable means such as cotter pin 168, similar to pin 162, and at the other end to the respective carriage 101 pivotally and slopes downwardly from its point of attachment to the bar 112. Links 166 are attached and length adjustable by means of apertures 167 similarly as described with respect to links 160. As seen in FIGS. 3 and 5, the inner ones of the links are formed to have their outer end portions offset to clear the respective carriages.

Since the lower ends of the links 160 and 166 are held to the respective carriages and therefore prevented from upward movement, upward movement of bar 112 pursuant to operation of jack 72 and the resulting upward movement of the upper ends of the links 160 and 166 causes the lower ends of the links 160 and 166 to move inwardly thereby pulling the carriages 82 and 101 inwardly to clampingly engage the crate 10 or other freight.

Figure 9:
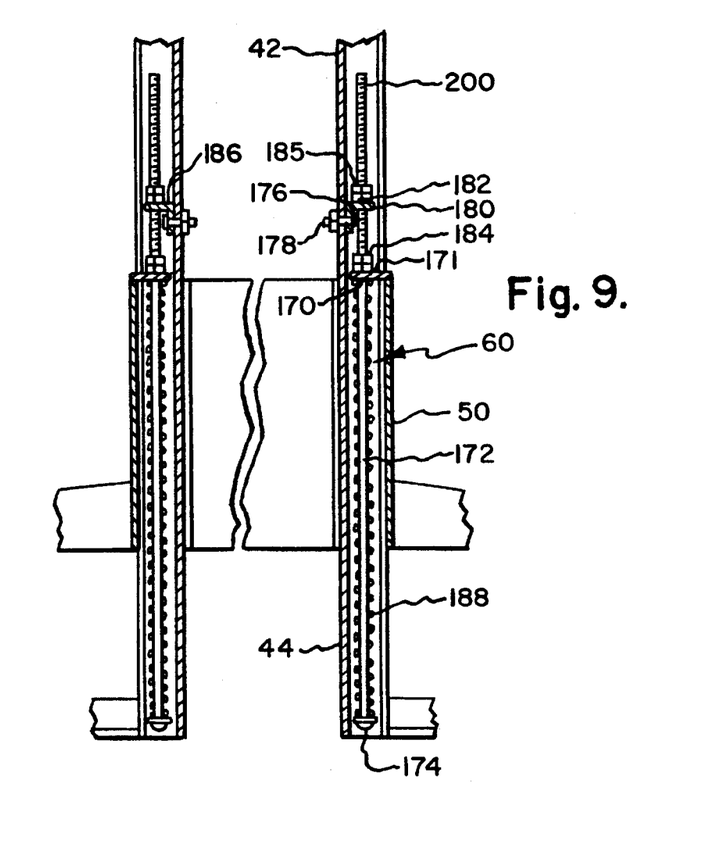
FIG. 9 is a sectional view taken along lines 9—9 of FIG. 1.

Referring to FIG. 9, the first or stationary frame plate 24 is further formed to provide a ledge portion 171 normal to each portion 50 at the upper edge thereof. The ledge 171 extends inwardly of the channel 60, i.e., between the terminal edges of portions 66 of the respective support member 42, and contains an aperture, illustrated at 170 therein. A bolt 172 is received in the aperture 170 with the bolt head 174 within the channel 60 and below the aperture 170. A bracket 176 is attached to the central portion 44 of the upwardly movable support member 42 by suitable means such as a pair of bolts one shown at 178. The bracket 176 is attached so that a portion 180 thereof extends inwardly of the support member 42 above the ledge 171 and has an aperture 182 aligned with aperture 170 for receiving the threaded upper end portion 200 of the bolt 172. A pair of nuts 184 are provided on the threaded portion 200 of the bolt 172 and are positioned between portions 171 and 180 to engage the upper surface of ledge 171, and a pair of nuts 185 are provided on the threaded portion 200 to be above and engage the upper surface 186 of bracket portion 180. A spring 188 is provided between the ledge 171 and the bolt head 174 to bias the respective support member 42 and thus the vertically movable second frame 22 to the down position so that a certain amount of force is required to effect movement of the second frame 22 upwardly. The amount of force required for such movement is adjustable by means of the nuts 184. The height of the wheels 20 in relation to the floor 16 is adjustable by means of nuts 185.

Figures 10, 11:
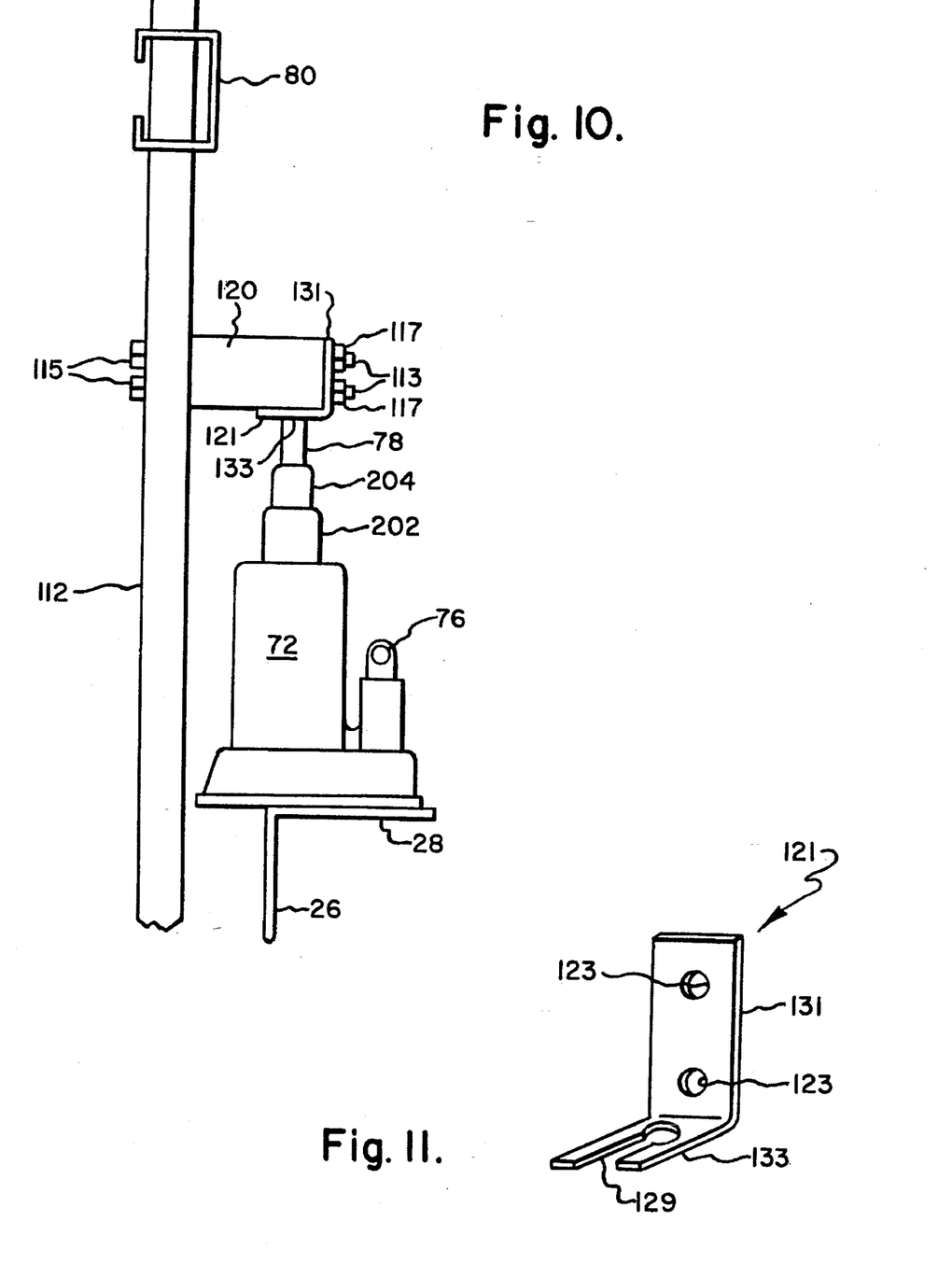
FIG. 10 is an enlarged partial side view thereof.
FIG. 11 is a perspective view of a clip for securing a jack thereof.

As best seen in FIG. 10, the jack 72 is attached to vertical bar 112 for vertical movement thereof by means of horizontal bar 120 which is attached to one end of bar 112 by suitable means such as a pair of bolts 113, which may be ⅜ inch grade 5 bolts (or better) and which extend through the bar 112 and through the length of bar 120. The bolt heads 115 engage the bar 112 and nuts 117 engage the bar 120 so as to allow maximum bolt shear strength unreduced by threads in the bolt passage between the bars. The bar 120 rests on top of the jack adjusting member 78 and is held in alignment by suitable means such as clip 121. Clip 121, shown in FIG. 11, has a pair of apertures 123 on one portion 131 for receiving bolts 113 for attachment of the clip to the end of bar 120. A second portion 133 of the clip 121, which is at right angles to the first portion, engages the underside of the bar 120 and has a slot 129 the inner end of which is enlarged to receive the upper end of the jack adjusting member 78.

Movement of the bar 112 upwardly as the jack 72 is operated will transmit the jacking force through the links 160 and 166, the corresponding carriages 82 and 101, the corresponding rails 80 and 102, and the elongate support members 42. However, this jacking force is countered by the force applied by the spring 188 until the jacking force is great enough to overcome the spring force. Until this time, the second frame 22 does not move upwardly due to the force of the spring 188 but instead the jacking force is translated into movement of the carriages 82 and 101 toward each other to clamp onto the crate 10. As the clamping force is increased, the force transmitted to the vertical support members 42 increases so that when it is greater than the force exerted by the spring 188, the second frame 22 is caused to move upwardly to lift the clamped crate 10 off of the floor 16. At the same time, the wheels 48, which are no longer needed, are also lifted off of the floor 16, as shown in FIG. 1. With each end of the crate clamped and lifted by a dolly 14, the dollies with the crate clamped thereto may be easily and safely rolled along the floor for transport of the crate as desired.

A series of perhaps 5 spaced apertures 190 are provided in the upper portion of each of the links 160 and 166 to suitably adjust the link length to adjust the at-rest spacing between the carriages in relation to width of the freight to be handled.

Engagement of rail 80 by bar 120 limits the extent to which the clamps are moved toward each other.

After the crate 10 has been transported to a desired new location and it is desired to remove the dollies 14 therefrom, this may be achieved easily and quickly by operating the jack valve 74 to release the hydraulic pressure after which the second frame 22 will drop downwardly by gravity and assisted by spring 188, and springs 94 will act to increase the spacing between the carriages 82 and 101 thus lowering the crate to the floor and unclamping from it.

While the clamping pressure may be sufficient to hold and lift a piece of freight, it is preferred to provide a support for the freight. Referring to FIG. 3, such support may be provided by a plate 196 which is attached to the lower edge of each of the clamping members 96 extend inwardly therefrom and so as to be close to the floor. As seen in FIG. 4, the inner ends 198 thereof may be tapered thinly, i.e., as a dull blade, so as to more easily slip the plates 196 under an object to be lifted prior to clamping to the object and lifting it.

A conventional single stage jack may not provide the stroke length needed and an ability to rapidly raise the jack as may be desired during cargo handling. Referring to FIG. 10, in accordance with a preferred embodiment of the present invention, the jack 72 is of a telescoping type having a pair (or more) of stages, illustrated at 202 and 204, containing one hydraulic cylinder within another to provide an increased stroke length as well as an increased rate of movement over that provided by an otherwise similar single stage hydraulic jack. The cylindrical screw extension 78 is threadedly attached to the upper cylinder 204 for adjusting the jack to the dolly by increasing or decreasing the distance between bar 120 and the second cylinder 204. If adjusted properly, the dolly may have a vertical lift of perhaps about 5 inches.

A suitable two-stage hydraulic jack for use with the present invention is one identified as a low-body high-stage hydraulic jack and sold under stock no. 89XX9957W by J.C. Whitney & Co. of Chicago, Ill. Such a jack has a two-ton capacity, suitable for typical loads to be lifted, and a 9 inch stroke to suitably provide a lift range of 5 inches or more suitable for squeezing to the freight and lifting it from the floor perhaps 3 inches. Such a jack has a 1 ½ inch screw extension.

To insure that the lift range will be adequate for lifting a piece of freight, it may be desirable to adjust the clamp members 86 and 96 close to the freight before jacking begins so that a minimum amount of jacking is required for squeezing onto the freight. Such adjustment may be made by shortening the effective lengths of the links 160 and 166 by selecting suitable apertures 190 and 167 for insertion of cotter pins 162 and 168 respectively.

A dolly 14 as described herein may be provided to handle freight widths of between about 4 ½ and 16 inches.

It should be understood that while the present invention has been described in detail herein, the invention can be embodied otherwise without departing from the principles thereof. For example, a single stage jack may be connected to a pantographic linkage arrangement which is in turn connected to bar 112 so as to increase the speed of squeezing and lifting. Such other embodiments are meant to come within the scope of the present invention as defined by the appended claims.

What is claimed is:

1. A dolly comprising a first frame, wheel means attached to said first frame, a second frame connected to said first frame for movement vertically relative to said first frame, at least one pair of clamp members connected to said second frame, means for applying force, and means comprising a jack for translating by operating said jack the applied force in sequence into movement of said clamp members to clampingly engage freight then by continued operation of said jack into upward movement of said second frame relative to said first frame for lifting the clampingly engaged freight.

2. A dolly according to claim 1 further comprising support plate means attached to said second frame for disposing underneath the freight for support during lifting thereof.

3. A dolly according to claim 1 further comprising means for spring biasing said pair of clamp members away from each other.

4. A dolly according to claim 1 wherein said force applying means comprises a hydraulic jack having at least two stages.

5. A dolly comprising a first frame, wheel means attached to said first frame, a second frame connected to said first frame for movement vertical relative to said first frame, at least one pair of clamp members connected to said second frame, and means for applying force to effect movement of said clamp members to clampingly engage freight and thereafter to effect upward movement of said second frame relative to said first frame for lifting the clampingly engaged freight, the dolly further comprising wheel means attached to said second frame to provide self-support to the dolly, said second frame wheel means being lifted with the second frame when clampingly engaged freight is lifted.

6. A dolly comprising a first frame, wheel means attached to said first frame, a second frame connected to said first frame for movement vertically relative to said first frame, at least one pair of clamp members connected to said second frame, and means for applying force to effect movement of said clamp members to clampingly engage freight and thereafter to effect upward movement of said second frame relative to said first frame for lifting the clampingly engaged freight, wherein said at least one pair of clamp members comprises an upper and a lower pair of said clamp members.

7. Apparatus for lifting and transporting heavy elongate objects, the apparatus comprising a pair of dollies each including a first frame, wheel means connected to said first frame, a second frame connected to said first frame for movement vertically relative to said first frame, at least one pair of clamp members connected to said second frame, and means for applying force to effect movement of said clamp members to clampingly engage an end portion of an elongate object and thereafter to effect upward movement of said second frame relative to said first frame for lifting the clampingly engaged object whereby said dollies may be provided to clampingly engage opposite end portions respectively of an elongate object and thereafter to lift both end portions for transporting thereof.

8. Apparatus according to claim 7 further comprising wheel means attached to said second frame to provide self-support to the dolly, said second frame wheel means being lifted with the second frame when clampingly engaged freight is lifted.

9. Apparatus according to claim 7 further comprising support plate means attached to said second frame for disposing underneath the freight for support during lifting thereof.

10. Apparatus according to claim 7 further comprising means for spring biasing said pair of clamp members away from each other.

11. Apparatus according to claim 7 wherein said at least one pair of clamp members comprises an upper and a lower pair of said clamp members.

12. Apparatus according to claim 7 wherein said force applying means comprises a hydraulic jack having at least two stages.

13. A dolly comprising a first frame, wheel means attached to said first frame, a second frame connected to said first frame for movement vertically relative to said first frame, at least one pair of clamp members attached to said second frame for movement horizontally toward and away from each other, a vertically movable member, a pair of links each of which is pivotally attached to a respective one of said clamp members and pivotally attached to said vertically movable member for effecting horizontal movement of said clamp members in response to vertical movement of said vertically movable member, jacking means attached to said first frame for effecting vertical movement of said vertically movable member, spring means connected between said first and second frames for applying force for resisting upward movement of said second frame relative to said first frame whereby said jacking means may be operated to effect clamping engagement of an article of freight until the clamping force applied by the jacking means exceeds the resisting force applied by said spring means after which further operation of said jacking means effects lifting of the clamped article of freight.

14. A dolly according to claim 13 further comprising wheel means attached to said second frame to provide self-support to the dolly, said second frame wheel means being lifted with the second frame when clampingly engaged freight is lifted.

15. A dolly according to claim 13 further comprising support plate means attached to said second frame for disposing underneath the freight for support during lifting thereof.

16. A dolly according to claim 13 further comprising means for spring biasing said clamp members away from each other.

17. A dolly according to claim 13 wherein said at least one pair of clamp members comprises an upper and a lower pair of said clamp members.

18. A dolly according to claim 13 further comprising means for adjusting the distance along each of said links between the point of attachment thereof to said respective clamp member and the point of attachment thereof to said vertically movable member.

19. A dolly according to claim 13 further comprising means for adjusting said spring means force.

20. A dolly according to claim 13 wherein said jacking means comprises a hydraulic jack having at least two stages.

21. A method for lifting and transporting an object comprising providing a pair of dollies each having a first frame to which wheels are connected and a second frame movable vertically relative to said first frame and having a pair of clamp members, effecting clamping engagement of one end portion of the object by the second frame clamp members of one of the dollies, effecting clamping engagement of an other end portion of the object by the second frame clamp members of the other of the dollies, effecting movement of the second frame of said one dolly upwardly relative to the first frame thereof to lift the clamped one end portion of the object, and effecting movement of the second frame of said other dolly upwardly relatively to the first frame thereof to lift the clamped other end portion of the object whereby the dollies may be rolled along a floor for transporting the clamped object.

22. A method according to claim 21 further comprising providing a spring connected between the first and second frames for applying force for resisting upward movement of the second frame relative to the first frame, the method including operating a jack to effect the clamping engagement and thereafter to effect the movement upwardly of the second frame after the clamping force applied by the jack exceeds the resisting force applied by the spring.

23. A method according to claim 21 further comprising providing support plate means on said second frame and inserting the support plate means underneath the object for support during the lifting thereof.

* * * * *